United States Patent
Kelman et al.

[11] Patent Number: 5,413,750
[45] Date of Patent: May 9, 1995

[54] METHOD OF FABRICATING A PREFORM

[75] Inventors: Josh Kelman, Dover, N.H.; Robert Hames, York, Me.

[73] Assignee: Davidson Textron Inc., Dover, N.H.

[21] Appl. No.: 865,294

[22] Filed: Apr. 8, 1992

[51] Int. Cl.$^6$ .................... B27N 3/04; D04H 1/60
[52] U.S. Cl. ................... 264/517; 264/113; 264/115; 264/121
[58] Field of Search ........... 156/62.4, 283, 296, 156/307.1, 62.2, 276; 65/4.4, 484, 529, 377, 450; 425/82.1; 428/251, 285; 264/112, 113, 115, 121, 126, 128, 511, DIG. 53, DIG. 64, 517; 19/148, 304, 305; 239/DIG. 8

[56] References Cited

U.S. PATENT DOCUMENTS

| | | | |
|---|---|---|---|
| 2,518,744 | 8/1950 | Barnard | 154/27 |
| 2,577,205 | 12/1951 | Meyer et al. | 264/DIG. 53 |
| 2,629,969 | 3/1953 | Peyches | |
| 2,956,916 | 10/1960 | Voss et al. | 154/110 |
| 3,170,197 | 2/1965 | Brenner | 19/248 |
| 3,363,036 | 1/1968 | Craig | 264/91 |
| 3,674,599 | 7/1972 | Wiltshire | 425/82.1 |
| 3,775,219 | 11/1973 | Karlson et al. | 156/526 |
| 3,791,783 | 2/1974 | Damon et al. | 264/128 |
| 3,988,089 | 10/1976 | Hampshire | 425/82.1 |
| 4,061,485 | 12/1977 | Rimmel | 65/4 |
| 4,340,406 | 7/1982 | Neubauer | 65/9 |
| 4,496,384 | 1/1985 | Lin | 65/4.4 |
| 4,594,086 | 6/1986 | Mosnier | 65/4.4 |
| 4,615,717 | 10/1986 | Neubauer | 65/4.4 |
| 4,664,864 | 5/1987 | Wersosky | 264/301 |
| 4,923,731 | 5/1990 | Carley et al. | 428/285 |
| 4,952,366 | 8/1990 | Gelin | 65/4.4 |
| 5,147,653 | 9/1992 | Nelson | 156/62.2 |
| 5,192,387 | 3/1993 | Buckley | 264/112 |

FOREIGN PATENT DOCUMENTS

| | | | |
|---|---|---|---|
| 9957 | 3/1971 | Japan | 428/251 |
| 29868 | 9/1973 | Japan | 264/517 |
| 35917 | 2/1984 | Japan | 264/128 |

OTHER PUBLICATIONS

Ermert et al, "RU Reinforcing plastics with robots?", Plastics Engineering, May 1981.

Sonneborn, *Fiberglas Reinforced Plastics*, 1954, pp. 48–61.

Jander, Owens–Corning Fiberglas Technical Paper, "Industrial RTM New Developments in molding and preforming technologies," 1991, pp. 1–8.

*Primary Examiner*—Steven D. Maki
*Attorney, Agent, or Firm*—Reising, Ethington, Barnard, Perry & Milton

[57] ABSTRACT

A process for producing a preform includes the steps of retaining a glass fiber fabric (40) on a foraminous screen (14) by use of a vacuum draw and depositing chopped glass fibers (19) onto the glass fiber fabric with a binder that cures in place. The vacuum draw retains the deposited materials in place until the binder is cured.

1 Claim, 2 Drawing Sheets

METHOD OF FABRICATING A PREFORM

TECHNICAL FIELD

This invention relates generally to directed fiber preforming and, more particularly, to an improved process for forming a glass fiber preform.

BACKGROUND OF THE INVENTION

Glass fibers have been commonly incorporated in thermoplastic molded objects and other cured plastics for added strength and durability. The glass fiber is introduced in a mold where resinous plastic is then injected such that the glass fibers become imbedded into the final formed object. It has been found advantageous to form a preform of the final object out of glass fibers and place the preform into the mold. The glass fibers are often chopped and blown onto a preform screen. Immediately following the fiber placement, a binder agent is sprayed on and allowed to cure which sets the fibers in place.

This glass fiber process has two disadvantages. Firstly, the glass fibers may extend through the holes in the screen. Furthermore, some of the sprayed binder land directly onto the screen. When the binder and on the screen contact the glass fibers through the holes, removal of the preform becomes difficult. Secondly, strength of the preform is limited such that damage may occur to the preform when the preform is removed from the screen, rendering it useless.

What is needed is a process for manufacturing a preform which is easier to remove from the screen and which has increased strength and integrity for reducing damage to the preform during removal from the screen and subsequent handling thereof.

SUMMARY OF THE INVENTION

In accordance with one aspect of the invention, a process for making a fibrous preform includes the steps of drawing a vacuum by a suction fan through a foraminous screen, positioning a glass fabric material such as a woven roving or a scrim on an upstream side of the screen. The glass fabric is maintained in place by the suction exerted on the screen. Chopped fibers, for example glass fibers, are blown or otherwise deposited onto the glass fabric. A binder is also sprayed or otherwise deposited on the glass fabric and glass fibers. The binder is then cured to set the chopped fibers in place on the preform forming a laminate with the sheet of glass fabric.

Preferably, a second sheet of glass fabric is then positioned onto the fibers forming a sandwiched laminate with the chopped fibers interposed between two layers of glass fabric. This "sandwich" construction offers improved structural integrity of the molded part due to the higher strength of the outer laminate due to the directional woven roving.

The fibers and binder may be blown onto the screen via two or more adjacent nozzles that may have relative motion with respect to the screen. The relative motion may be controlled by a software program such that the application of the chopped fibers and binder is automated.

In this fashion a stronger preform is manufactured that is easily removed from the preform screen. A process for forming a preform comprises the steps of: drawing a vacuum through a foraminous screen having a plurality of sections; providing a gantry having a chopped glass fiber spray nozzle and binder spray nozzles wherein the binder spray nozzles include a left, right and top nozzle and said left, right and top nozzles are mounted about the chopped glass fiber spray nozzle; the gantry providing movement of the chopped glass fiber spray nozzle and the bindder spray nozzles along a first axis and along a second axis with respect to the screen such that the chopped glass fiber spray nozzle can be aligned with any section of the screen wherein the second axis is a vertical axis; moving the plurality of binder spray nozzles and the chopped glass fiber spray nozzle with the gantry from left to right along the first axis, downwardly along said second axis and from right to left along the first axis, depositing chopped glass fibers from the chopped glass fiber spray nozzle and onto the screen during the movement and depositing binder only from the left nozzle and onto the screen when the chopped glass fiber spray nozzle moves from left to right along the first axis, depositing binder only from the right nozzle and onto the screen when the chopped glass fiber spray nozzle moves from right to left along the first axis, and depositing binder only from the upper nozzle and onto the screen when the chopped glass fiber spray nozzle moves downwardly along the second axis; controlling deposition rate of the chopped glass fibers onto the plurality of sections of the screen and binder deposition rate onto the plurality of sections of the screen.

BRIEF DESCRIPTION OF THE DRAWINGS

Reference is now made to the accompanying drawings in which.

DETAILED DESCRIPTION OF THE PREFERRED EMBODIMENT

Figure 1:
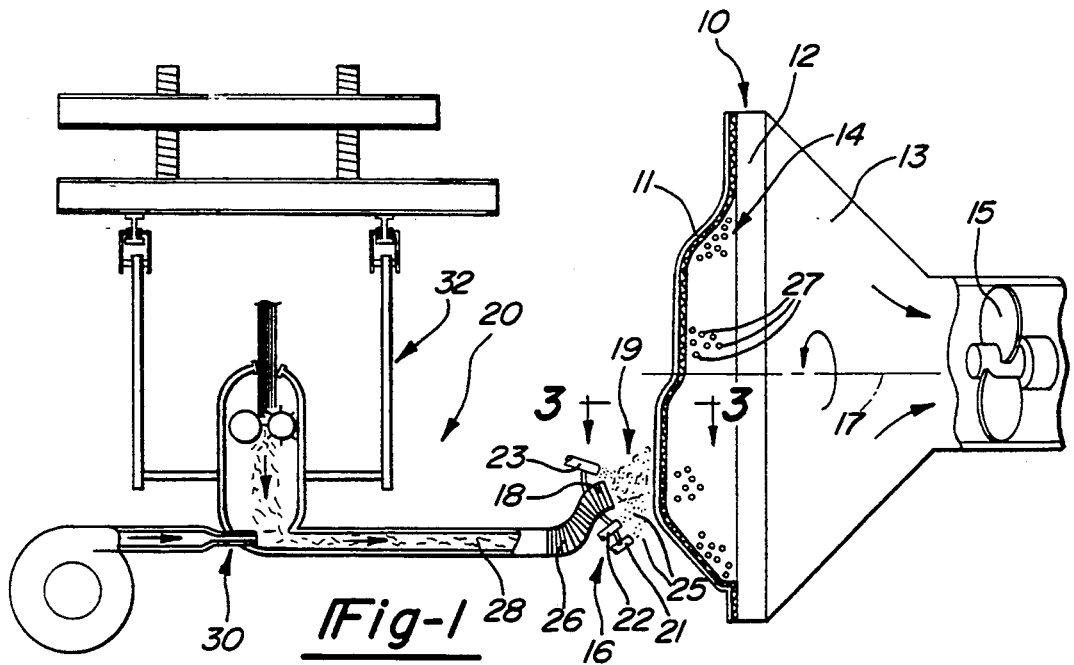
FIG. 1 is a schematic view of a preform apparatus in accordance with one embodiment of the invention.

Reference is now made to the drawings, particularly FIG. 1, which discloses a screen assembly 10 for forming a fiber glass preform 11. The screen assembly 10 includes a mounting table 12, a foraminous preform screen 14 and a suction fan 15. The screen 14 has a plurality of holes 27 and its contour conforms to the shape of one surface of the preform 11. The screen 14 is mounted about its periphery to the table 12 which in turn has appropriate duct work 13 for housing the suction fan 15. The suction fan when actuated draws a vacuum through the screen 14. The screen 14 may also be mounted for rotation about axis 17.

Figure 2:
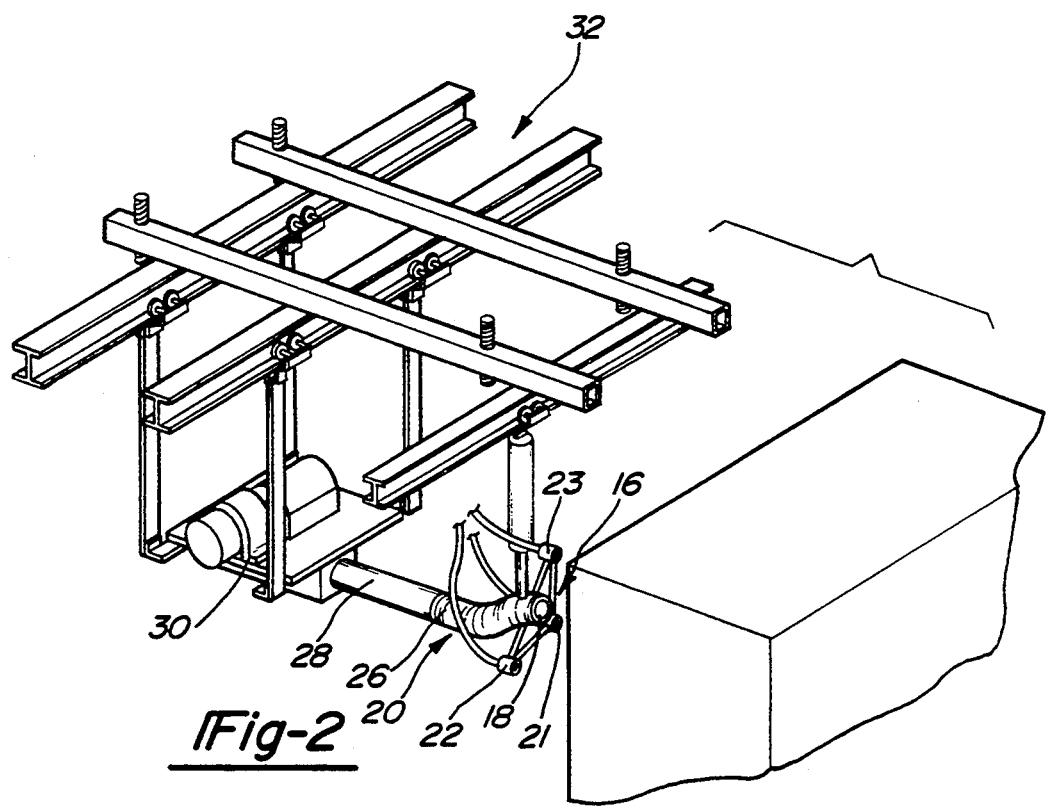
FIG. 2 is a perspective view of the gantry apparatus shown in FIG. 1.

As illustrated in FIGS. 1 and 2, a nozzle control system, generally indicated as 20 includes a spray assembly 16 having a nozzle 18 for deposition of blown glass fibers 19 and three nozzles 21,22, and 23 for the spraying of curable binder 25. The fiber nozzle 18 is the distal end of a flexible tube 26 which has its other end mounted onto a rigid delivery tube 28 communicating from a chopper/blower assembly 30. The tubes 26 and 28 and chopper/blower assembly 30 are mounted on a gantry 32 that can move the nozzles left, right, up, and down relative to the screen 14.

Figure 3:
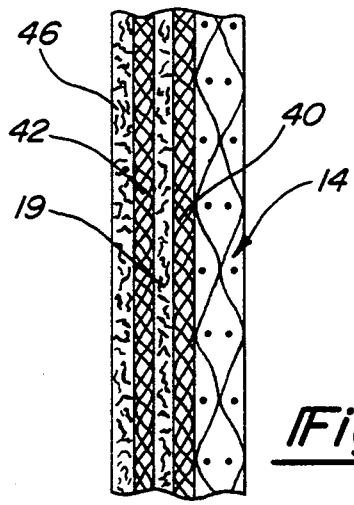
FIG. 3 is a fragmentary cross-sectional view of the screen and preform taken along lines 3—3 shown in FIG. 1.

The preform 11 is shown assembled on the screen 14 in FIG. 3. A porous glass fabric 40 is first placed on the screen 14 and held in place by the vacuum draw caused by suction fan 15. The fabric 40 may be a loosely woven scrim such as Fiberglass Industries "Revlok 450". Alternatively, the glass fabric 40 may be a tighter weave such as a woven roving. The glass fabric 40 is held in place by the vacuum from suction fan 15. Chopped glass fibers 19 and binder 25 are sprayed onto the woven roving 40. The chopped glass fibers may be chopped between 1" and 4" in length depending on the application. The glass roving used to make the chopped glass fibers may be a commercially available roving such as one sold under the brand name PPG-5542. A second layer of glass fabric 42 may be placed onto the chopped glass fibers 19 to form a sandwich laminate with the chopped glass fibers 19 interposed between two layers of glass fabric. Additional layers of chopped glass fibers 46 or glass fabric may be laminated as needed for particular applications. The formed laminated fabric is held in place by the vacuum until the binder is cured. The first fabric layer 40 provides for easier removal of the preform 11 from the screen 14. The fabric layers 40 and 42 also provide increased strength and handling integrity to the preform.

Figure 4:
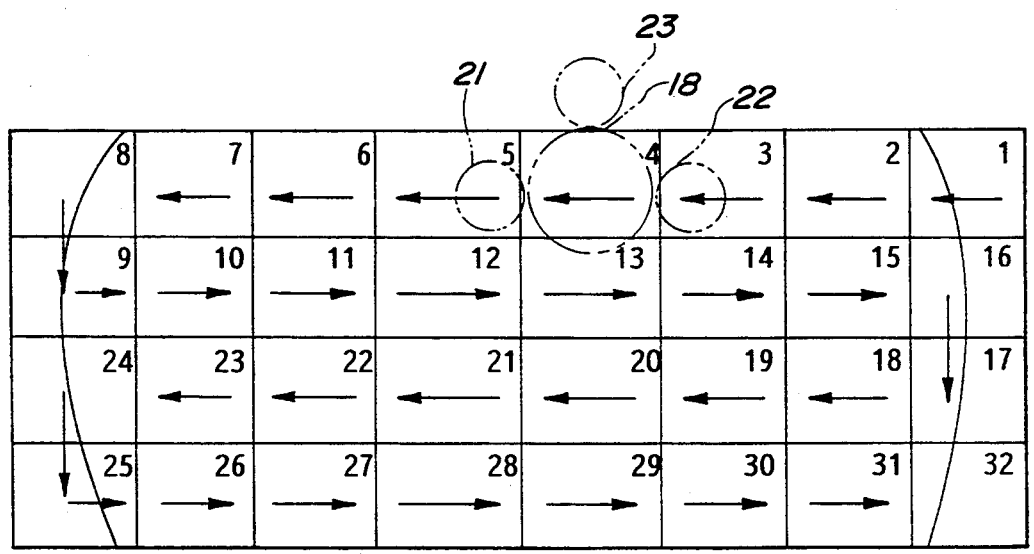
FIG. 4 is a schematic view of the screen divided up into matrix squares for use with a control system that control motion of the nozzles for the fiber and binder used therewith.

The gantry 32 may be programmed to work automatically by control software for adding each layer of the chopped glass fiber 19. The automatic control system may divide the screen into a series of matrix squares 1–32, as shown in FIG. 4, where each matrix square of the screen controls the movement of the gantry and thus the nozzles' movement over the respective matrix squares 1–32. The software also can control the rate of chopped fiber delivery by controlling the speed of the chopper/blower 30 and can control the amount of binder per square by controlling the binder nozzles' opening and fluid pressure. As shown in FIG. 4, spray assembly 16 is shown superimposed in phantom on the matrix. The fiber nozzle 18 may move from right to left to cover matrix squares 1–8 with right binder nozzle 22 operating to spray binder on the newly blown and deposited fibers. Nozzle 23 operates over square 8 when the glass fiber nozzle 18 moves downwardly from square 8 to square 9. Left binder nozzle 21 operates when the glass fiber nozzle 18 is moved from left to right from square 9 to square 16. Nozzle 23 is turned on to cover square 16 as glass fiber nozzle 18 moves downwardly again from square 16 to square 17. This pattern is then repeated until the whole screen 12 is covered.

Glass application rate and glass blower rate are also simultaneously controlled as well as other machine parameters, main blower pressure, screen rotation, and binder application rate.

In this fashion, a improved process for creating an improved preform is achieved by reducing entanglement of the preform with the preform screen and providing increased integrity of the preform for subsequent handling.

Variations and modifications other than those shown are possible without departing from the scope and spirit of the present invention as defined by the appended claims.

The embodiments in which an exclusive property or privilege is claimed are defined as follows:

1. A process for forming a preform comprising the steps of:

drawing a vacuum through a foraminous screen having a plurality of sections;

providing a gantry having a chopped glass fiber spray nozzle and binder spray nozzles wherein said binder spray nozzles include a left, right and top nozzle and said left, right and top nozzles are mounted about said chopped glass fiber spray nozzle;

said gantry providing movement of said chopped glass fiber spray nozzle and said binder spray nozzles along a first axis and along a second axis with respect to said screen such that said chopped glass fiber spray nozzle can be aligned with any section of said screen wherein said second axis is a vertical axis;

moving said plurality of binder spray nozzles and said chopped glass fiber spray nozzle with said gantry from left to right along said first axis, downwardly along said second axis and from right to left along said first axis, depositing chopped glass fibers from said chopped glass fiber spray nozzle and onto said screen during said step of moving and depositing binder only from said left nozzle and onto said screen when said chopped glass fiber spray nozzle moves from left to right along said first axis, depositing binder only from said right nozzle and onto said screen when said chopped glass fiber spray nozzle moves from right to left along said first axis, and depositing binder only from said upper nozzle and onto said screen when said chopped glass fiber spray nozzle moves downwardly along said second axis;

controlling deposition rate of the chopped glass fibers onto the plurality of sections of said screen and binder deposition rate onto said plurality of sections of said screen.

\* \* \* \* \*